(12) United States Patent
Littmann et al.

(10) Patent No.: US 8,217,124 B2
(45) Date of Patent: Jul. 10, 2012

(54) ETHYLENE POLYMERIZATION IN A HIGH PRESSURE REACTOR WITH IMPROVED INITIATOR FEEDING

(75) Inventors: Dieter Littmann, Mücke (DE); Andre-Armand Finette, Köln (DE); Jürgen Peter Mohrbutter, Alfter (DE); Sven George Wolfram, Euskirchen (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/144,492

(22) PCT Filed: Jan. 14, 2010

(86) PCT No.: PCT/EP2010/000141
§ 371 (c)(1),
(2), (4) Date: Aug. 24, 2011

(87) PCT Pub. No.: WO2010/081684
PCT Pub. Date: Jul. 22, 2010

(65) Prior Publication Data
US 2011/0301307 A1 Dec. 8, 2011

(30) Foreign Application Priority Data
Jan. 16, 2009 (EP) .................... 09000590

(51) Int. Cl.
*C08F 2/00* (2006.01)
*B01J 4/00* (2006.01)
*C08F 10/02* (2006.01)
(52) U.S. Cl. ............. 526/64; 526/86; 526/919; 422/131; 222/129
(58) Field of Classification Search .............. 222/129; 526/64, 96, 919, 86; 422/131
See application file for complete search history.

(56) References Cited

U.S. PATENT DOCUMENTS

| | | | |
|---|---|---|---|
| 3,334,081 A * | 8/1967 | Madgwick et al. ............. 526/64 |
| 3,405,115 A | 10/1968 | Schappert | |
| 4,135,044 A | 1/1979 | Beals | |
| 4,794,004 A | 12/1988 | Pfleger | |
| 5,187,245 A | 2/1993 | Nakamura | |
| 6,887,955 B2 * | 5/2005 | Deckers et al. ................. 526/79 |
| 2005/0037219 A1 | 2/2005 | Ohlsson | |
| 2006/0149004 A1 | 7/2006 | Lee | |
| 2007/0032612 A1 * | 2/2007 | Fouarge ......................... 526/64 |
| 2011/0294967 A1 | 12/2011 | Littmann et al. | |

FOREIGN PATENT DOCUMENTS

| | | |
|---|---|---|
| EP | 0121755 A2 | 10/1984 |
| GB | 1569518 | 6/1980 |
| JP | 2003327606 | 11/2003 |

(Continued)

*Primary Examiner* — Fred M Teskin
(74) *Attorney, Agent, or Firm* — Dilworth IP LLC

(57) ABSTRACT

Process for the preparation of ethylene homopolymers or copolymers in a high pressure reactor with at least two spatially separated initiator injection points by polymerizing ethylene and optionally further monomers in the presence of at least two different mixtures of free-radical polymerization initiators at from 100° C. to 350° C. and pressures in the range of from 160 MPa to 350 MPa, wherein the process comprises the following steps:

a) providing at least two different initiators as solution in a suitable solvent or in liquid state, b) mixing the initiators and optionally additional solvent in at least two static mixers and c) feeding each of the mixtures to a different initiator injection point of the high pressure reactor, and apparatus for feeding initiator mixtures to a high pressure reactor with at least two spatially separated initiator injection points.

18 Claims, 2 Drawing Sheets

FOREIGN PATENT DOCUMENTS

| | | |
|---|---|---|
| WO | WO-0001740 | 1/2000 |
| WO | WO-01/14441 | 3/2001 |
| WO | WO-01/93225 | 12/2001 |
| WO | WO-2004/078800 | 9/2004 |
| WO | WO-2004078800 | 9/2004 |
| WO | WO-2004108271 | 12/2004 |
| WO | WO-2005065818 | 7/2005 |
| WO | WO-2007110127 | 10/2007 |

* cited by examiner

ETHYLENE POLYMERIZATION IN A HIGH PRESSURE REACTOR WITH IMPROVED INITIATOR FEEDING

This application is the U.S. national phase of International Application PCT/EP2010/000141, filed Jan. 14, 2010, claiming priority to European Patent Application 09000590.1 filed Jan. 16, 2009, and the benefit under 35 U.S.C. 119(e) of U.S. Provisional Application No. 61/209,519, filed Mar. 6, 2009; the disclosures of International Application PCT/EP2010/000141, European Patent Application 09000590.1 and U.S. Provisional Application No. 61/209,519, each as filed, are incorporated herein by reference.

The present invention relates to a process for the preparation of ethylene homopolymers or copolymers in a high pressure reactor with at least two spatially separated initiator injection points and to an apparatus for feeding initiator mixtures to such a reactor.

BACKGROUND OF THE INVENTION

Polyethylene is one of the most frequently used commercial polymers. It can be prepared by a couple of different processes. Polymerization in the presence of free-radical initiators at elevated pressures was the method first discovered to obtain polyethylene and continues to be a valued process with high commercial relevance for the preparation of low density polyethylene (LDPE). LDPE is a versatile polymer which can be used in a variety of applications, such as film, coating, molding, and wire and cable insulation. There is consequently still demand for optimizing the processes for its preparation.

A normal set-up for a high pressure LDPE reactor consists essentially of a set of two compressors, a primary and a high pressure compressor, a polymerization reactor and two separators for separating the monomer-polymer mixture leaving the tubular reactor, wherein in the first separator, the high pressure separator, the ethylene separated from the monomer-polymer mixture is recycled to the ethylene-feed between the primary compressor and the high pressure compressor and the ethylene separated from the mixture in the second separator, the low pressure separator, is added to the stream of fresh ethylene before it is fed to the primary compressor. Common high pressure LDPE reactors are either tubular reactors or autoclave reactors. Both types of reactors have very often more than one injection point for initiators, thus creating multiple reaction zones.

A key factor to control the polymerization conditions of each reaction zone is the amount and the nature of the used initiator. Adding initiator starts the polymerization reaction, which is strongly exothermic. Accordingly, the temperature rises, which not only influences the polymerization reaction but also the decomposition of the initiator. In view of this complex interdependency it has been proven to be advantageous to use mixtures of different initiators. Since however the polymerization conditions of different reaction zones differ it is further necessary to use different initiator mixtures in different reaction zones. As a consequence, appropriate initiators or initiator mixtures have to be selected for each grade and each reaction zone. This can be done based on experience and experimental date. This can however also be supported by computer-aided tools as described in WO 2004/078800, which refers to a method of controlling the process for the continuous free-radical polymerization of ethylene homopolymers or copolymers by selecting initiator mixtures with respect to minimum initiator costs.

Initiators for starting a free-radical-initiated polymerization like organic peroxide have to be handled with care since such compounds are noxious and thermally unstable. If heated above a certain temperature they will decompose in a runaway reaction. Accordingly, storage and handling of such chemicals need special precautions.

For carrying out the polymerization in high pressure reactors with initiator mixtures, it is common practice to premix the initiators, optionally with additional solvents, and meter such a mixture to the reactor. The number of mixtures which has to be prepared is limited and equals at the most the number of reaction zones. Usually, the components of the initiator mixtures are withdrawn from some storage facilities, combined in a special mixing vessel and then transferred to a reservoir, from which the initiator mixtures are metered to the respective reaction zone. However, since each mixing operation requires special attention of the operators, the number of mixing operations in a given time period should be as low as possible and moreover, if a larger quantity of material is mixed, small divergences in the amounts result only in relatively small variations of the composition. That means, the initiator mixtures are generally prepared in a quite large scale. Although this method provides a reliable way for entering initiator mixtures into a reactor, there are still drawbacks. The method is labor intensive and it lacks flexibility. There is no room to react if parameters of the reaction vary, for example, the composition of the ethylene feed, the temperature of the cooling water, the cooling behavior in the high pressure recycle or different conditions of the high pressure compressor. Moreover, in case of a desired grade change it is either necessary to wait with the transition until the whole quantity of initiator mixture is consumed or the remaining quantity of initiator mixture has to be disposed of, which is not only costly but also ecologically unfavorable and labor intensive. Furthermore, if an initiator mixture is kept too long, there is always the chance that this initiator mixture deteriorates. The over-all activity can diminish or a phase-separation may occur. Causes could be, for instance, that by-products of different initiators react with each other or that they react with other initiators.

BRIEF SUMMARY OF THE INVENTION

Consequently, it is an object of the present invention to remedy the disadvantages mentioned and to find a reliable and flexible method for dosing multiple initiator mixtures to a high pressure polymerization reactor, which allows easy variation of the polymerization conditions and brings forth a higher operational availability of the polymerization plant and a lower specific consumption rate of initiator.

We have found that this object is achieved by a process for the preparation of ethylene homopolymers or copolymers in a high pressure reactor with at least two spatially separated initiator injection points by polymerizing ethylene and optionally further monomers in the presence of at least two different mixtures of free-radical polymerization initiators at from 100° C. to 350° C. and pressures in the range of from 160 MPa to 350 MPa, wherein the process comprises the following steps:

a) providing at least two different initiators as solution in a suitable solvent or in liquid state,
b) mixing the initiators and optionally additional solvent in at least two static mixers and
c) feeding each of the mixtures to a different initiator injection point of the high pressure reactor.

Furthermore, we have found an apparatus for feeding initiator mixtures to a high pressure reactor with at least two spatially separated initiator injection points.

BRIEF DESCRIPTION OF THE DRAWINGS

The features and advantages of the present invention can be better understood via the following description and the accompanying drawings, where.

DETAILED DESCRIPTION OF THE INVENTION

Figure 1:
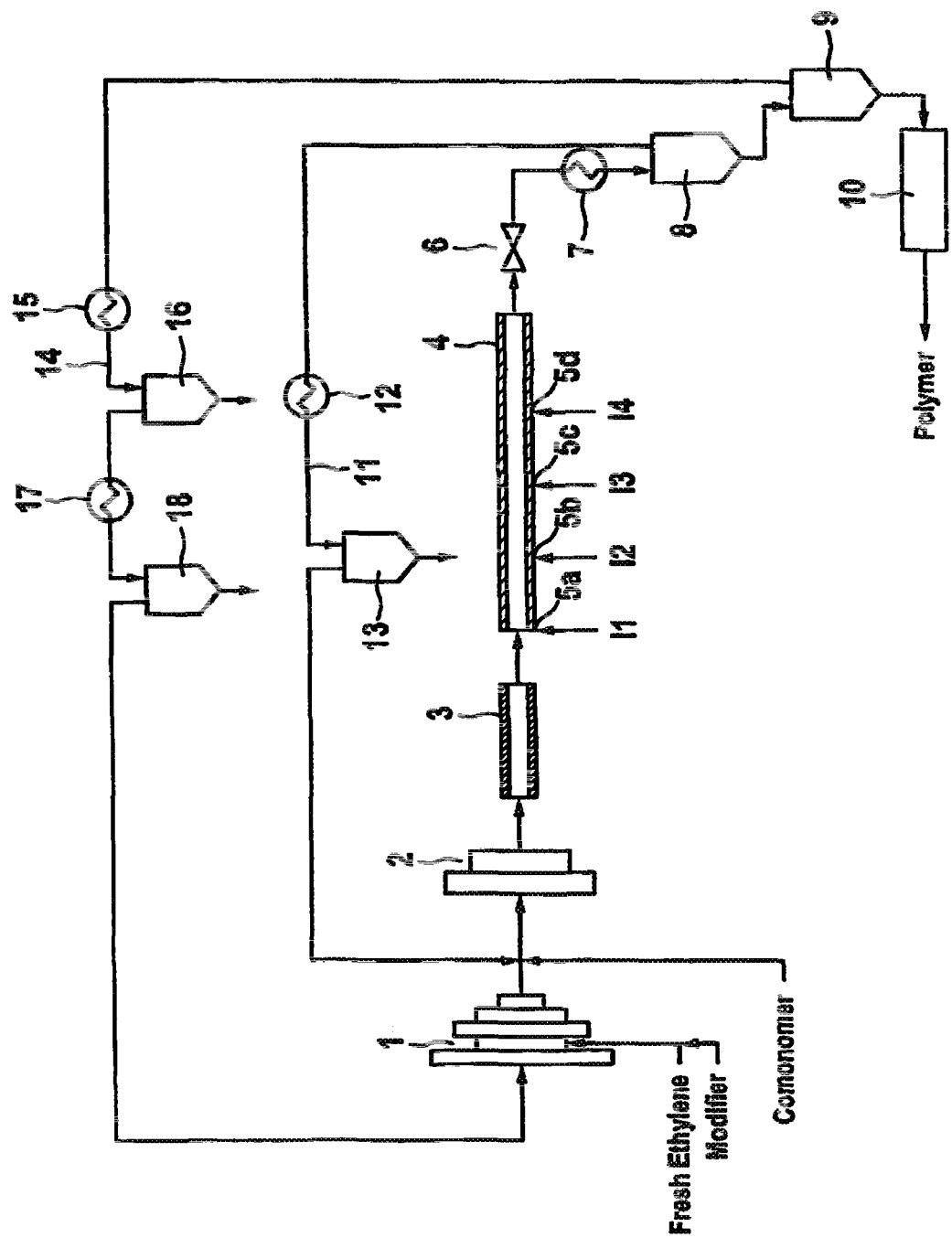
FIG. 1 shows schematically the set-up of a tubular polymerization reactor and FIG. 2 shows the set-up of a peroxide metering system according to the present invention.

The process of the invention can be used both for the homopolymerization of ethylene and for the copolymerization of ethylene with one or more other monomers, provided that these monomers are free-radically copolymerizable with ethylene under high pressure. Examples of suitable copolymerizable monomers are $\alpha,\beta$-unsaturated $C_3$-$C_8$-carboxylic acids, in particular maleic acid, fumaric acid, itaconic acid, acrylic acid, methacrylic acid and crotonic acid, derivatives of $\alpha,\beta$-unsaturated $C_3$-$C_8$-carboxylic acids, e.g. unsaturated $C_3$-$C_{15}$-carboxylic esters, in particular esters of $C_1$-$C_6$-alkanols, or anhydrides, in particular methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and $\alpha$-olefins such as propene, 1-butene, 1-pentene, 1-hexene, 1-octene or 1-decene. In addition, vinyl carboxylates, particularly preferably vinyl acetate, can be used as comonomers. n-Butyl acrylate, acrylic acid or methacrylic acid are particularly advantageously used as comonomer. In the case of copolymerization, the proportion of comonomer or comonomers in the reaction mixture is from 1 to 45% by weight, preferably from 3 to 30% by weight, based on the amount of monomers, i.e. the sum of ethylene and other monomers. Depending on the type of comonomer, it can be preferred to feed the comonomers at a plurality of different points to the reactor.

For the purposes of the present invention, polymers are all substances which are made up of at least two monomer units. They are preferably LDPE polymers having a mean molecular weight $M_n$ of more than 20 000 g/mole. However, the method of the invention can also be advantageously employed in the preparation of oligomers, waxes and polymers having a molecular weight $M_n$ of less than 20 000 g/mole.

In the preparation of highly viscous products, e.g. MFR (190° C./2.16 kg)<1 g/10 min, it can be advantageous to add the monomer or monomers not only at the inlet of the reactor tube but to feed in monomers at a plurality of different points on the reactor. This is particularly preferably done at the beginning of further reaction zones.

The process of the present invention is carried out with at least two different mixtures of at least two free-radical polymerization initiators. Such initiators for starting the polymerization in the respective reaction zone can be, for example, azo compounds or peroxidic polymerization initiators. Examples of suitable organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethyl¬hexanoylperoxy) hexane, tert-amyl peroxy-2-ethylhexanoate, dibenzoyl peroxide, tert butyl peroxy-2-ethylhexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert butyl peroxybenzoate, methyl isobutyl ketone hydroperoxide, 3,6,9-triethyl-3,6,9-trimethyl¬triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, are also suitable. It is possible to use either individual initiators or preferably mixtures of various initiators. A large range of initiators, in particular peroxides, are commercially available, for example the products of Akzo Nobel offered under the trade names Trigonox® or Perkadox®.

In a preferred embodiment of the process of the invention, peroxidic polymerization initiators having a relatively high decomposition temperature are used. Suitable peroxidic polymerization initiators include, for example, 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne, and particular preference is given to using di-tert-butyl peroxide.

The initiators can be employed individually or as a mixture in concentrations of from 0.1 to 50 mol/t of polyethylene produced, in particular from 0.2 to 20 mol/t, in each zone, provided that at least two different mixtures of initiators are fed to at least two spatially separated initiator injection points of the high pressure reactor. In the sense of the present invention, mixtures of initiators differ if they are composed of different initiators, or, if they are composed of the same initiators, the relative amounts of the initiators differ.

It is often advantageous to use the initiators in the dissolved state. Examples of suitable solvents are ketones and aliphatic hydrocarbons, in particular octane, decane and isododecane and also other saturated $C_8$-$C_{25}$-hydrocarbons. The solutions comprise the initiators or initiator mixtures in proportions of from 2 to 65% by weight, preferably from 5 to 40% by weight and particularly preferably from 10 to 30% by weight. Particular preference is given to using mixtures of initiators which have different decomposition temperatures.

According to the invention, at least two mixtures of initiators, which are prepared by static mixers, are metered into the high pressure reactor. That means, the polymerization in at least two reaction zones of the reactor is started by initiator mixtures. It is possible that in other reaction zones the polymerization reaction is started with only one initiator. It is however preferred, that all reaction zones of the reactor are started by initiator mixtures. Preferably all mixtures of initiator, which are fed to the reactor, are prepared by static mixers.

For preparing the initiator mixtures according to the present invention at least two different initiators are provided as solution in a suitable solvent or in liquid state and conveyed together through the static mixers. The obtained mixtures are then fed to the high pressure reactor. It is further possible to add additional solvent to the mixtures by having accessorily also a stream of this solvent flown through the static mixers. Preferably the initiators are taken from devices, which keep the initiator solutions or liquid initiators at constant pressure, to provide constant conditions in front of the mixing points. Suitable are for example storage tanks which are equipped with circulation lines, in which pumps circulate the content of the tanks through a pressure control valve. Such storage tanks themselves can be filled up from conventional equipment to hold or transport chemical compounds, which can for example be bulk storage, Intermediate Bulk Containers (IBC) or small canisters.

The maximum number of initiators, of which the initiator mixtures can be composed, depends on the installed set-up for the initiator dosing system, i.e. on the number of installed storage tanks. This number is theoretically unlimited, will however normally not exceed six. In preferred embodiments for the present invention the set-up for the initiator dosing system has four or five storage tanks corresponding to a maximum number of four or five initiators, which can make up the initiator mixtures. The ratio of the initiators in the initiator mixture, that means the relative amount of the initiators, is regulated by varying the streams of the initiator solutions or the liquid initiators through the static mixers.

Usually the composition of the initiator mixtures differs for different grades, and moreover also the different initiator injection points are provided with different mixtures, varying in the kind of the used initiators and/or in their amount. Furthermore, it is even possible to adapt the exact composition of the initiator mixtures to varying reaction condition, e.g., varying quality of raw materials, different temperature of the cooling water etc.

In a preferred embodiment of the inventive process the mixtures obtained by the static mixers are first metered to buffer tanks and then fed from these buffer tanks to the reaction zones of the high pressure reactor, preferably by further pumps, which convey the mixtures to the initiator injection points. In a further preferred embodiment of the inventive process, the content of the buffer tanks is additionally agitated by agitators installed in the buffer tanks, allowing, e.g., more intense mixing of the initiator mixtures or preventing deteriorating of the initiator mixtures, for example by phase separation.

It is possible to use the buffer tanks only for balancing small variations of the dosing process, which means, the mixtures obtained in the static mixers are permanently fed to the buffer tanks at substantially the same rate as these mixtures are then fed from the buffer tanks to the initiator injection points of the high pressure reactor. It is however also possible, and often preferred, that the mixing in the static mixers is carried at intervals alternating between periods of time in which no mixing occurs and periods of time in which the feeding rate of the mixtures to the buffer tank is higher then the feeding rate of the mixtures from the buffer tanks to the initiator injection points. This has the advantage that the accuracy of the peroxide compositions can be increased in case of specific low peroxide consumption and it allows for short interruptions of the initiator mixing process without interfering with the polymerization, accordingly increasing reliability of the reactor. If the dosing of the initiators is carried out in this way, the period of time, in which no initiator mixture is fed to the buffer tank, generally exceeds the period of time, in which initiator mixture is fed to the buffer tank. Preferably the ratio of the period of time, in which no initiator mixture is fed to the buffer tank, to the period of time, in which initiator mixture is fed to the buffer tank is in the rage of from 2 to 20 and especially in the rage of from 3 to 10. Replenishing the buffer tanks by feeding initiator mixture is usually repeated from every 10 minutes to 10 hours and preferably from every 30 minutes to 2 hours.

Normally, the initiator mixture obtained in one static mixer is fed directly or via a buffer tank to one specific initiator injection point. That means, each initiator injection point has assigned one static mixer or, if buffer tanks are use, one combination of static mixer and buffer tank. It can however also be advantageous to feed one mixture of initiators to more than one initiator injection point. This can be the case if mixtures of the same combination of initiators shall be used in more than one reaction zone. To have the ability to do so, it is necessary to a have a closable connection between two feeding lines in-between the static mixers and the initiator injections points. It is of course self understandable that in case a mixture of initiators obtained in one static mixer is fed to more than one reactions zone, the static mixer, which is normally delivering to that reaction zone, is discontinued to work.

In a preferred embodiment of the present invention the feeding steps and the fill levels of the tanks are monitored and controlled by an automatic control system.

In the process of the invention, the molecular weight of the polymers to be prepared can as usual be controlled by addition of modifiers which act as chain-transfers agents. Examples of suitable modifiers are hydrogen, aliphatic and olefinic hydrocarbons, e.g. pentane, hexane, cyclohexane, propene, 1 pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol. Particular preference is given to using saturated aliphatic aldehydes, in particular propionaldehyde or $\alpha$-olefins such as propene or 1-hexene.

The process of the invention is carried out at pressures of from 160 MPa to 350 MPa, with pressures of from 180 MPa to 340 MPa being preferred and pressures of from 200 MPa to 330 Pa being particularly preferred. The temperatures are in the range from 100° C. to 350° C., preferably from 120° C. to 340° C. and very particularly preferably from 150° C. to 320° C. In the case of copolymerization of ethylene with sensitive or strongly regulating comonomers, in particular free radically polymerizable carboxylic esters, e.g. vinyl esters, the polymerization is preferably carried out at temperatures below 230° C. In general, preference is given to a process in which the polymerization temperature is not higher than 320° C.

The flowing reaction mixture generally comprises polyethylene in an amount in the range from 0% by weight to 45% by weight, based on the total monomer-polymer mixture, preferably from 0% by weight to 35% by weigh.

The process of the present invention can be carried out with all types of high pressure reactors, which have at least two spatially separated initiator injection points. Suitable high pressure reactors are, e.g., tubular reactors or autoclave reactors. Preferably the high pressure reactor is a tubular reactor. FIG. 1 shows a typical set-up for a preferred tubular polymerization reactor without however restricting the invention to the embodiments described therein.

The fresh ethylene, which is usually under a pressure of 1.7 MPa, is firstly compressed to a pressure of about 30 MPa by means of a primary compressor (1) and then compressed to the reaction pressure of about 300 MPa using a high pressure compressor (2). The molecular weight regulator is added to primary compressor (1). The reaction mixture leaving the high pressure compressor (2) is fed to pre-heater (3), where the reaction mixture is preheated to the reaction start temperature of from about 120° C. to 220° C., and then conveyed to the tubular reactor (4).

The tubular reactor (4) is basically a long, thick-walled pipe with cooling jackets to remove the liberated heat of reaction from the reaction mixture by means of a coolant circuit (not shown). It is usually from about 0.5 km to 4 km, preferably from 1.5 km to 3 km and especially from 2 km to 2.5 km long. The inner diameter of the pipe is usually in the range of from about 30 mm to 120 mm and preferably from 60 mm to 90 mm. The tubular reactor (1) has usually a length-to-diameter ratio of greater than 1000, preferably from 10000 to 40000 and especially from 25000 to 35000.

The tubular reactor (4) shown in FIG. 1 has four spatially separated initiator injection points (5a) to (5d), where the four initiators or initiator mixtures I1 to I4 are fed to the reactor, thus creating four reaction zones. In general, it is sufficient for the present invention that the tubular reactor is equipped with two initiator injection points resulting in two reaction zones. Preferably the number of initiator injection points and reaction zones is from three to six and especially four.

The reaction mixture leaves the tubular reactor (4) through a high-pressure let-down valve (6) and passes a post reactor cooler (7). Thereafter, the resulting polymer is separated off from unreacted ethylene and other low molecular weight compounds (monomers, oligomers, polymers, additives, solvent, etc) by means of a high-pressure separator (8) and a low-pressure separator (9), discharged and pelletized via an extruder and granulator (10).

The ethylene which has been separated off in the high-pressure separator (8) is fed back to the inlet end of the tube reactor (4) in the high-pressure circuit (11) at 30 MPa. It is first freed from other constituents in at least one purification stage and then added to the monomer stream between primary compressor (1) and high pressure compressor (2). FIG. 1 shows one purification stage consisting of a heat exchanger (12) and a separator (13). It is however also possible to use a plurality of purification stages. The high-pressure circuit (11) usually separates waxes.

The ethylene which has been separated off in the low-pressure separator (9), which further comprises, inter alia, the major part of the low molecular weight products of the polymerization (oligomers) and the solvent, is worked up in the low-pressure circuit (14) at a pressure of from about 0.1 to 0.4 MPa in a plurality of separators with a heat exchanger being located between each of the separators. FIG. 1 shows two purification stages consisting of heat exchangers (15) and (17) and separators (16) and (18). It is however also possible to use only one purification stages or preferably more than two purification stages. The low-pressure circuit (14) usually separates oil and waxes.

The present invention further refers to an apparatus for feeding initiator mixtures to a high pressure reactor for polymerizing ethylene and optionally further monomers by free-radical polymerization with at least two spatially separated initiator injection points. Such an apparatus comprises a) at least two storage tanks for holding initiator solutions or liquid initiators, b) at least two static mixers for mixing the initiator solutions or liquid initiators, and c) at least two sets of valves to regulate the flow of the initiator solutions or liquid initiators through the static mixers. Preferably such an apparatus further comprises d) connected to each storage tank, a pump for conveying the initiator solutions or liquid initiators to the static mixers, wherein it is especially preferred if e) each storage tank is equipped with a circulation line, in which the pump circulates the content of storage tanks through a pressure control valve, which is controlled by a pressure sensor.

In a preferred embodiment such an apparatus further comprises f) buffer tanks after the static mixers, preferably together with g) pumps for conveying the initiator mixture from the buffer tanks to the respective initiator injection points of the high pressure reactor. In a further preferred embodiment such an apparatus further comprises h) closable connections lines with valves for conveying the initiator mixture from one buffer tank to more than one initiator injection point of the high pressure reactor.

Preferably such an apparatus has from two to six storage tanks and especially three or four. The apparatus of the present invention can have any number of static mixers to provide any number of initiator mixtures. Preferably the number of static mixer equals the number of reaction zones of the high pressure reactor. Most preferred are apparatuses with three or four static mixer, accordingly being able to provide up to three or four different initiator mixtures.

Preferably the apparatus for feeding initiator mixtures is monitored by an automatic control system, which measures and controls the valves and the fill levels of the tanks.

Figure 2:
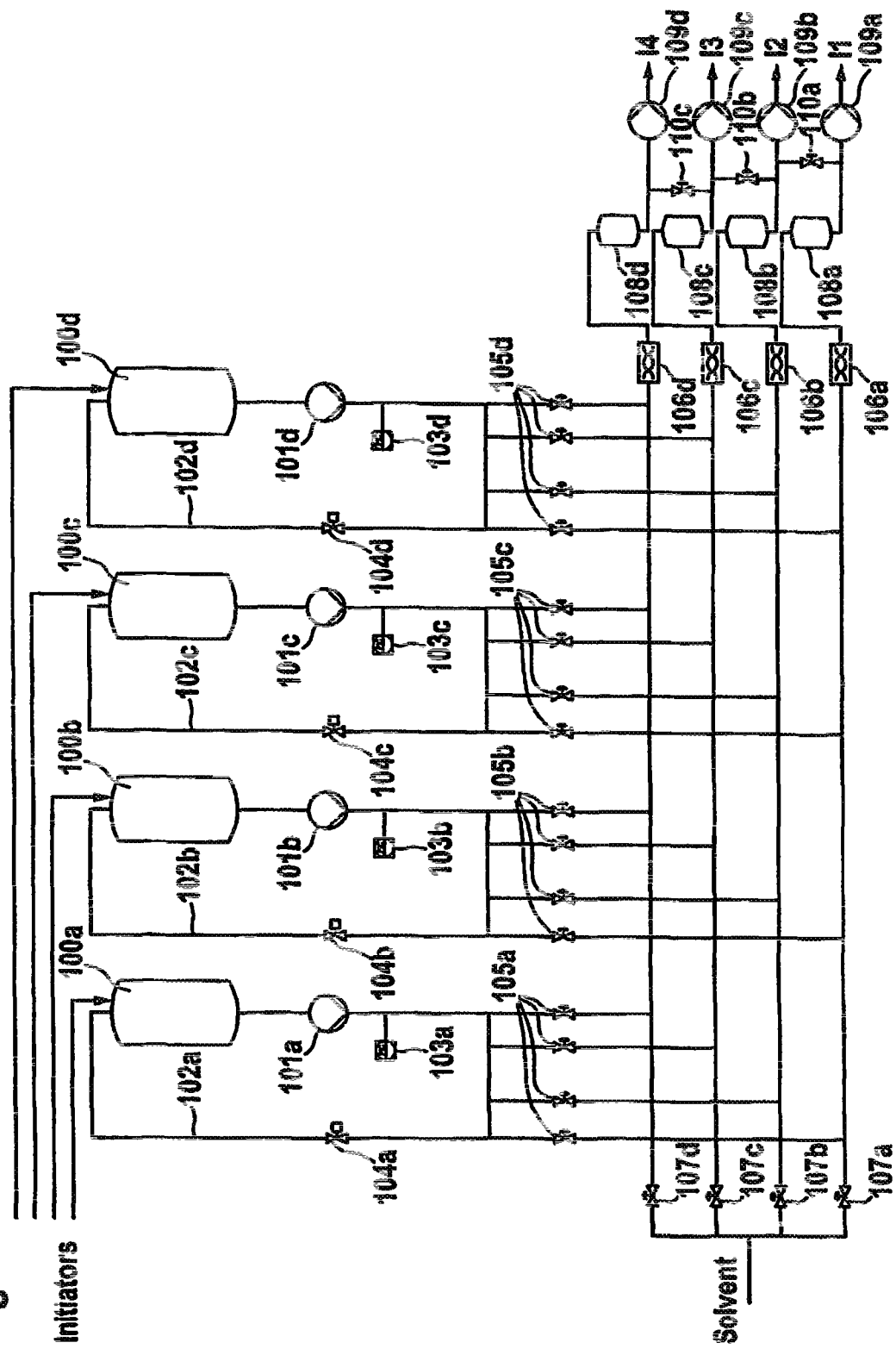

FIG. 2 shows a preferred embodiment for such an apparatus, which provides the possibility to meter four different initiators or initiator mixtures to four reaction zones, wherein each initiator mixture can be composed of up to four different initiators, however without intending to restrict the present invention to the embodiments described therein.

The apparatus comprises four storage tanks (100a, 100b, 100c, 100d) for holding initiator solutions or liquid initiators, four pumps (101a, 101b, 101c, 101d) connected to each storage tank (100a, 100b, 100c, 100d) for conveying the initiator solutions or liquid initiators, four static mixers (106a, 106b, 106c, 106d) for mixing the initiator solutions or liquid initiators, and four sets of valves (105a, 105b, 105c, 105d) to regulate the flow of the initiator solutions or liquid initiators through the static mixers (106a, 106b, 106c, 106d). The storage tanks (100a, 100b, 100c, 100d) are equipped with a circulation line (102a, 102b, 102c, 102d), in which the pump (101a, 101b, 101c, 101d) circulates the content of storage tanks (100a, 100b, 100c, 100d) through a pressure control valve (104a, 104b, 104c, 104d), which is controlled by a pressure sensor (103a, 103b, 103c, 103). Moreover, valves (107a, 107b, 107c, 107d) allow to add additional solvent to the static mixers (106a, 106b, 106c, 106d).

The apparatus further comprises buffer tanks (108a, 108b, 108c, 108d) to take up the initiator mixtures obtained in the static mixers (106a, 106b, 106c, 106d) and pumps (109a, 109b, 109c, 109d) for conveying the initiator mixture from the buffer tanks (108a, 108b, 108c, 108d) to the respective polymerization zone of the high pressure reactor. Closable connections lines with valves (110a, 110b, 110c) in-between the static mixers and the initiator injections points allow to convey initiator mixtures from one buffer tank (108a, 108b, 108c, 108d) to more than one initiator injection point of the high pressure reactor.

The present invention provides the advantages that it allows reacting flexibly to changing conditions in the high pressure reactor and enables fast and easy transition between different grades. It improves initiator efficiency, provides more constant product quality and reduces the amount of off-spec material produced in the reactor.

We claim:

1. A process for the preparation of ethylene homopolymers or copolymers in a high pressure reactor with at least two spatially separated initiator injection points by polymerizing ethylene and optionally further monomers in the presence of at least two different mixtures of free-radical polymerization initiators at from 100° C. to 350° C. and pressures in the range from 160 MPa to 350 MPa, wherein the process comprises the following steps:
- a) providing at least two different initiators as solution in a suitable solvent or in liquid state,
- b) mixing the initiators and optionally additional solvent in at least two static mixers, and
- c) feeding each of the mixtures to a different initiator injection point of the high pressure reactor.

2. The process of claim 1, wherein the high pressure reactor is a tubular reactor.

3. The process of claim 1, wherein the mixtures obtained by the static mixers are first metered to buffer tanks and then fed from the buffer tanks to the initiator injection points of the high pressure reactor.

4. The process of claim 3 wherein the mixtures prepared in the static mixers are permanently obtained and fed to the buffer tanks at substantially the same rate as the mixtures are fed to the initiator injection points of the high pressure reactor.

5. The process of claim 3 wherein the mixing in the static mixers is carried out at intervals alternating between periods of time in which no mixing occurs and periods of time, in which the feeding rate of the mixtures to the buffer tank is higher than the feeding rate of the mixtures from the buffer tanks to the initiator injection points of the high pressure reactor.

6. The process of claim 5, wherein the ratio of the period of time, in which no initiator mixture is fed to the buffer tank, to the period of time, in which initiator mixture is fed to the buffer tank, is in the range of from 2 to 20.

7. The process of claim 3, wherein the mixture of one buffer tank is fed to at least two spatially separated initiator injection points.

8. The process of claim 1, wherein the feeding steps and the fill levels of the tanks are monitored and controlled by an automatic control system.

9. An apparatus for feeding initiator mixtures to a high pressure reactor for polymerizing ethylene and optionally further monomers by free-radical polymerization with at least two spatially separated initiator injection points, comprising
- a) at least two storage tanks for holding initiator solutions or liquid initiators,
- b) at least two static mixers for mixing the initiator solutions or liquid initiators,
- c) at least two sets of valves to regulate the flow of the initiator solutions or liquid initiators through the static mixers, and
- f) buffer tanks after the static mixers.

10. The apparatus of claim 9, further comprising
- g) pumps for conveying the initiator mixture from the buffer tanks to the respective initiator injection points of the high pressure reactor.

11. The apparatus of claim 9, further comprising
- h) closable connections lines with valves for conveying the initiator mixture from one buffer tank to more than one initiator injection point of the high pressure reactor.

12. An apparatus for polymerizing ethylene and optionally further monomers by free-radical polymerization comprising a high pressure reactor having at least two spatially separated initiator injection points and an apparatus for feeding initiator mixtures to said high pressure reactor, comprising
- a) at least two storage tanks for holding initiator solutions or liquid initiators,
- b) at least two static mixers for mixing the initiator solutions or liquid initiators,
- c) at least two sets of valves to regulate the flow of the initiator solutions or liquid initiators through the static mixers.

13. The apparatus of claim 12, further comprising
- d) connected to each storage tank, a pump for conveying the initiator solutions or liquid initiators to the static mixers.

14. The apparatus of claim 12, further comprising
- e) for each storage tank, a circulation line, in which the pump circulates the content of storage tanks through a pressure control valve, which is controlled by a pressure sensor.

15. The apparatus of claim 12, wherein the valves and the fill levels of the tanks are monitored and controlled by an automatic control system.

16. The apparatus of claim 12, further comprising:
- f) buffer tanks after the static mixers.

17. The apparatus of claim 16, further comprising
- g) pumps for conveying the initiator mixture from the buffer tanks to the respective initiator injection points of the high pressure reactor.

18. The apparatus of claim 16, further comprising
- h) closable connections lines with valves for conveying the initiator mixture from one buffer tank to more than one initiator injection point of the high pressure reactor.

* * * * *